US011023618B2

(12) United States Patent
Berman (10) Patent No.: US 11,023,618 B2
(45) Date of Patent: Jun. 1, 2021

(54) SYSTEMS AND METHODS FOR DETECTING MODIFICATIONS IN A VIDEO CLIP (71) Applicant: PAYPAL, INC., San Jose, CA (US)

(72) Inventor: Zachary Joseph Berman, San José, CA (US)

(73) Assignee: PayPal, Inc., San Jose, CA (US)

(*) Notice: Subject to any disclaimer, the term of this patent is extended or adjusted under 35 U.S.C. 154(b) by 353 days.

(21) Appl. No.: 16/108,048

(22) Filed: Aug. 21, 2018

(65) Prior Publication Data
US 2020/0065526 A1 Feb. 27, 2020

(51) Int. Cl.
G06F 21/64 (2013.01)
G06T 1/00 (2006.01)
G06K 9/00 (2006.01)

(52) U.S. Cl.
CPC ......... *G06F 21/64* (2013.01); *G06K 9/00288* (2013.01); *G06K 9/00744* (2013.01); *G06T 1/0021* (2013.01)

(58) Field of Classification Search
CPC .................. G06F 21/64; G06T 1/0021; G06T 2201/0051; G06T 2201/0061; G06T 1/0028; G06K 9/00288; G06K 9/00744
See application file for complete search history.

(56) References Cited

U.S. PATENT DOCUMENTS

| | | | |
|---|---|---|---|
| 5,960,081 A | 9/1999 | Vynne et al. | |
| 6,633,651 B1* | 10/2003 | Hirzalla | G06K 9/00711 382/100 |
| 7,216,232 B1* | 5/2007 | Cox | G06T 1/0021 713/176 |
| 7,793,318 B2 | 9/2010 | Deng | |
| 2006/0047967 A1* | 3/2006 | Akhan | H04N 5/76 713/176 |
| 2007/0083815 A1* | 4/2007 | Delorme | G11B 27/28 715/723 |
| 2008/0002894 A1 | 1/2008 | Hayon et al. | |
| 2009/0290752 A1* | 11/2009 | Kalva | G06K 9/00711 382/100 |
| 2010/0177891 A1* | 7/2010 | Keidar | G06F 21/64 380/200 |
| 2014/0325550 A1* | 10/2014 | Winograd | H04N 21/8456 725/19 |
| 2016/0198200 A1* | 7/2016 | Choi | H04N 21/4394 725/19 |

* cited by examiner

Primary Examiner — Huan V Doan
(74) Attorney, Agent, or Firm — Haynes and Boone LLP (57) ABSTRACT Techniques for digital video authentication (and preventing fake videos) are disclosed. First pixels within a first image frame of the video clip representing an area of interest within the first image frame may be identified. The area of interest may correspond to a person's face or another object. A first frame signature may be calculated based on the first pixels. Second pixels within a second image frame of the video clip representing an area of interest within the second image frame may be identified. A second hash value may be calculated based on the second pixels. The authenticity of the video clip may be determined by comparing the first and second hash values against data extracted from third pixels within the first image frame that do not correspond to the area of interest in the first image frame.

20 Claims, 8 Drawing Sheets

SYSTEMS AND METHODS FOR DETECTING MODIFICATIONS IN A VIDEO CLIP

BACKGROUND

The present specification generally relates to video processing, and more specifically, to detecting and/or preventing modifications to digital videos based on frame signatures embedded within a video clip according to various embodiments of the disclosure.

RELATED ART

As high quality video capturing devices, such as those implemented within mobile phones, are widely available nowadays, digital videos have become an increasingly popular tool for recording and/or reporting events.

However, sophisticated video editing techniques, such as Deepfake, that use artificial intelligence to synthesize human images, pose a threat to the credibility of videos. These techniques enable users to easily superimpose images of one person (e.g., the face of a person) onto images or videos that show bodies of another person in a manner that is not easily detectable by human eyes. These techniques have been used by malicious users to manipulate existing media to generate content that is deceptive, for example, generating fake news. Without readily available tools that can determine the authenticity of a video, it may be challenging for the public to detect that the content of the video has been previously modified. Thus, there is a need for effectively and accurately detecting and/or preventing modifications of digital content.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for detecting modifications to a video clip by embedding one or more frame signatures in the image frames of the video clip. When a video clip comprising a sequence of image frames is being generated, pixels within each image frame may be analyzed to calculate a frame signature representing a feature within the image frame.

In some embodiments, pixels satisfying predetermined criteria may be identified. These predetermined criteria may be pixels that represent an area of interest (e.g., a feature) within the image frame, or pixel values within a predetermined range. The predetermined criteria may correspond to specific content (e.g., a person's face, a specific object, etc.) represented by at least a portion of the image frame. Thus, depending on the specific content that is represented in the video clip, a pixel identification algorithm, among multiple pixel identification algorithms, may be selected to identify the pixels within the image frame that correspond to the area of interest.

In one example, the predetermined criteria may correspond to a person's face. As such, a pixel identification algorithm including a facial recognition algorithm may be selected. When the selected pixel identification algorithm is applied to the image frame, pixels within the image frame that represent a person's face may be identified. In another example, the predetermined criteria may correspond to a car. In such an instance, a pixel identification algorithm that includes an object recognition algorithm may be selected. When such a pixel identification algorithm is applied to the image frame, pixels within the image frame that represent a car may be identified.

Once the pixels satisfying the predetermined criteria are identified, a value (e.g., a frame signature) may be calculated based on the identified pixels. For example, the frame signature may be calculated by applying a hash function to the pixel values corresponding to the identified pixels. In some embodiments, when the image frame includes audio data in addition to pixel data, the audio data may be used in combination with the pixel values to calculate the frame signature. The frame signature is then embedded in at least some of the background pixels within the image frame.

Background pixels are pixels within the image frame that do not satisfy the predetermined criteria (e.g., do not correspond to the area of interest) according to various embodiments. In some embodiments, instead of embedding the frame signature in all of the background pixels, a group of background pixels may be selected within the image frame for embedding the frame signature. For example, when encoding the video clip by a video encoder, a compression algorithm used by the encoder may identify one or more blocks of pixels (also referred as pixel blocks) within the image frame that have identical pixel values in a previous image frame. Instead of storing the pixel values of the one or more blocks of pixels for the image frame, the encoder may replace the one or more blocks of pixels with reference vectors that point to the corresponding blocks of pixels in the previous image frame to reduce storage space for the video clip. Embedding the frame signature in the one or more blocks of pixels may reduce the compression efficiency as the encoder can no longer replace the one or more blocks of pixels with the reference vectors (during the process of compression). As such, in some embodiments, blocks of background pixels that do not have corresponding pixels in the previous image frames (with identical pixel values) are selected as the group of background pixels. The frame signature may then be embedded in the group of background pixels. Embedding the frame signature includes embedding the various bits of the frame signature in the pixel values of the group of background pixels (e.g., in the least significant bits of the group of background pixels).

In some embodiments, in addition to embedding the frame signature of the image frame into the group of background pixels within the image frame, a frame signature calculated for a previous image frame may also be embedded within the image frame. Embedding the frame signature of the previous image frame in addition to the frame signature calculated for the current image frame enables that not only modifications to the content of the image frame, but also modifications to the order of the sequence of the image frames in the video clip can be detected. For example, if a frame within the video clip is being shuffled to a different position within the sequence, while the frame signature of the current image frame may match the embedded data within the current image frame, the frame signature of the previous image frame (after the shuffling) would no longer match the embedded data.

Once frame signatures are calculated and embedded within their corresponding image frames, the video clip may be encoded by a video encoder. For example, the video encoder may encode the video based on one of the standard video coding formats, such as MPEG-2, MPEG-4, H.264, etc. The encoded video clip may be transmitted to other devices for storage or playback. The encoded video clip may also be streamed by a video streaming application.

In some embodiments, in order to detect whether the video clip has been modified after the video clip has been created, for each image frame within the video clip, a frame signature of the image frame (and a frame signature of a previous image frame, if available) may be calculated and compared against the data embedded within the image frame. The video clip may be determined to be authentic when the frame signature of each frame (and the frame signature of a previous image frame) matches the data embedded within the corresponding image frame. On the other hand, the video clip may be determined to be inauthentic (e.g., fake) when the data embedded within the image frame does not match the calculated frame signature(s).

In some embodiments, the mechanism for determining the authenticity of a video clip may be integrated within a video player (e.g., a video playback application, a video streaming application, etc.), such that the video player may determine the authenticity of a video clip as the video player is performing a playback of the video clip. In some of these embodiments, the video player may be configured to perform an action based on the determined authenticity of the video clip being played. For example, when it is determined that the video clip is authentic, the video player may display a graphic on an interface of the video player indicating that the video is authentic. On the other hand, when it is determined that the video clip is inauthentic (e.g., the video clip has been modified), the video player may be configured to display another graphic on the interface indicating that the video may be fake or has been altered. In addition, the video player may abort playing (or streaming) the video clip when the video player determines that the video clip is fake or has been altered.

Using the authenticity determination methods disclosed herein according to various embodiments of the disclosure, the authenticity of a video clip may be determined accurately and efficiently. For example, the authenticity of each portion of the video clip (e.g., each frame) may be determined as the video clip is being played by a video player such that the determination of the authenticity of the video clip can be performed in real-time. In other words, no additional pre-processing of a video clip is required before the video clip is played, in various embodiments. Using the methods disclosed herein, it can be detected when a notable feature of a video clip (e.g., the face of the person appearing in the video clip) has been modified. Since the frame signatures embedded into an image frame are generated based solely on pixel data of the image frame (and pixel data of a previous image frame) in various embodiments, the authenticity of the video clip can be determined even when the video clip comprises a portion of another video clip (extracted from the other video clip). Thus, a video clip can be broken into multiple parts and the authenticity of each part can be independently verified using the various embodiments disclosed herein. In addition, no external storage of data (e.g., tables of signatures) is required as the frame signatures are advantageously embedded within pixels of the image frames themselves.

Conventional techniques for detecting modification of a video clip require processing the entire video clip as a whole, such as encrypting the entire video clip using a private key. Thus, the entire video clip has to be analyzed as a whole in order to determine whether modifications have been done to any portions of the video clip. On the other hand, as discussed above, the techniques as disclosed herein advantageously enable different portions of the video clip to be analyzed independently to determine whether the portions of the video clip have been modified.

Figure 1:
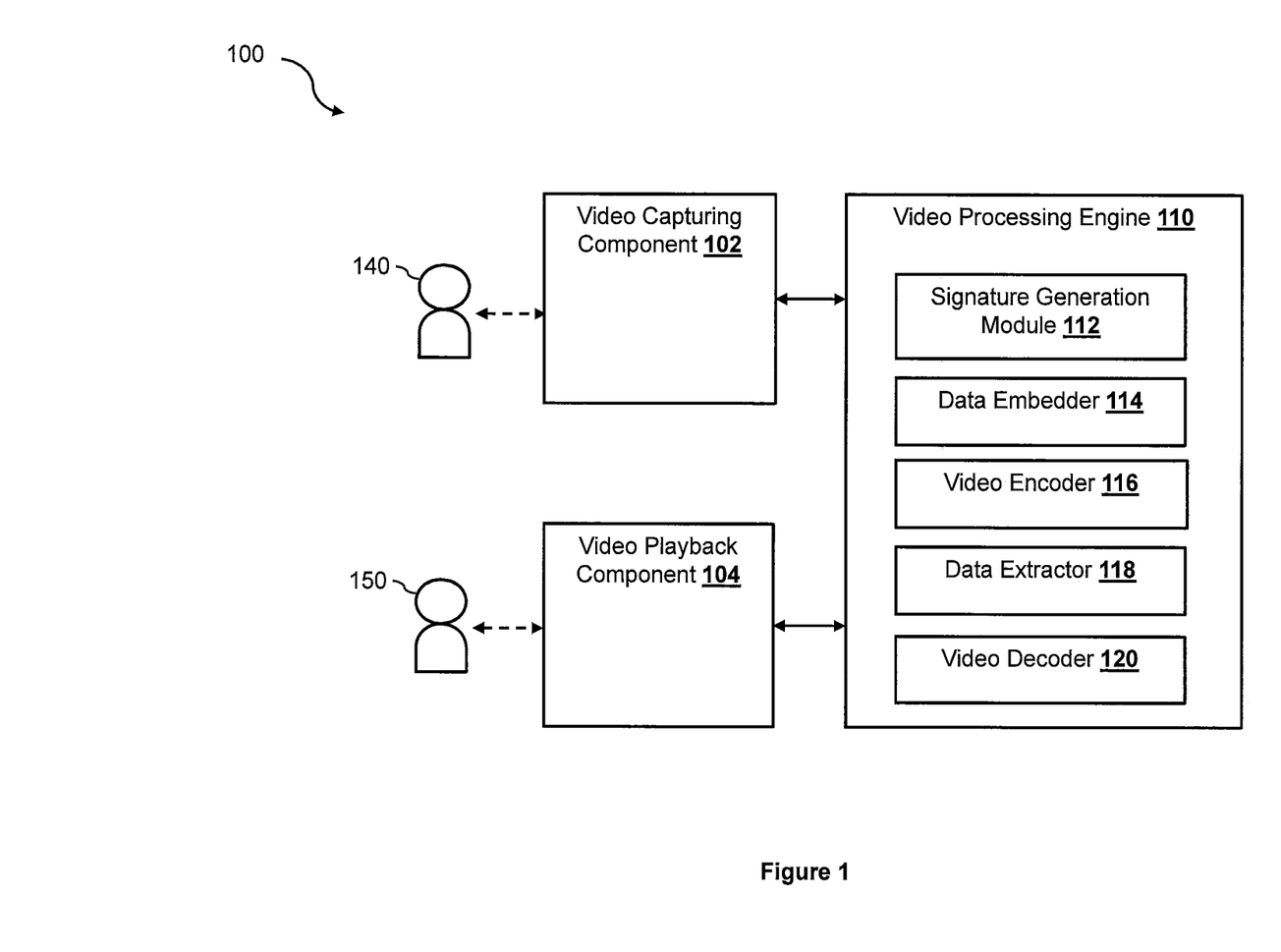
FIG. 1 is a block diagram illustrating a video processing system according to an embodiment of the present disclosure.

FIG. 1 illustrates a video processing system 100 for detecting modifications to video clips according to various embodiments of the disclosure. The video processing system 100 includes a video capturing component 102, a video processing engine 110, and a video playback component 104. As shown, the video processing engine 110 includes a signature generation module 112 for generating frame signatures based on the image frames of a video clip, a data embedder 114 for embedding frame signatures and other data into the image frames, a video encoder 116 for encoding the video clip, a data extractor 118 for extracting data from the image frames, and a video decoder 120 for decoding the video clip.

The video capturing component 102 may include elements such as a lens assembly, an imaging sensor (e.g., a complementary metal-oxide-semiconductor (CMOS) sensor), and other elements which together, are configured to generate a video clip comprising a sequence of image frames representing a scene over a period of time. In one example, the video capturing component 102 is a video camera. The video capturing component 102 may be a standalone device or may be integrated with another electronic device (e.g., a smart phone). As the video clip is being generated by the video capturing component 102, the video clip may be transmitted to the video processing engine 110 for further processing of the video clip. For example, the video processing engine 110 may generate and embed frame signatures into the image frames, and encode the video clip according to various embodiments of the disclosure.

In some embodiments, the video processing engine 110 (or parts thereof, such as the signature generation module 112, the data embedder 114, and the video encoder 116) may be implemented within the same device (e.g., the smart phone, etc.) as the video capturing component 102. Once the video clip is processed by the video processing engine 110, the video clip may be stored (e.g., in a hard drive, a flash drive, etc.) and/or transmitted to any other device for playback, such as by the video playback component 104. The video playback component 104 may include an output component, such as a screen or a projector, for presenting the video clip. In one example, the video playback component 104 is a video player. The video playback component 104 may be a standalone device or may be integrated within another electronic device (e.g., a smart television, a smart phone, etc.).

As discussed above, advanced media editing technologies enable modifications to video clips to be performed that can be difficult to detect by human eyes. For example, an image of a face of a first person may be superimposed onto a video clip representing a body of a second person such that the first person may appear to be captured in the video clip and may appear to be doing what the second person is captured doing in the video clip. Due to advanced editing algorithms such as Deepfake, viewers of the modified video clip may not even notice that the video clip has been modified and corrupted, and does not represent the actual event that was captured in the original video clip.

As such, in some embodiments, the video processing engine 110 may determine an authenticity of a video clip by generating frame signatures based on the image frames and comparing the frame signatures against data embedded within the image frames. In some embodiments, the video processing engine 110 (or parts thereof, such as the signature generation module 112, the data extractor 118, and the video decoder 120) may be implemented within the same device as the video playback component 104.

Figure 2:
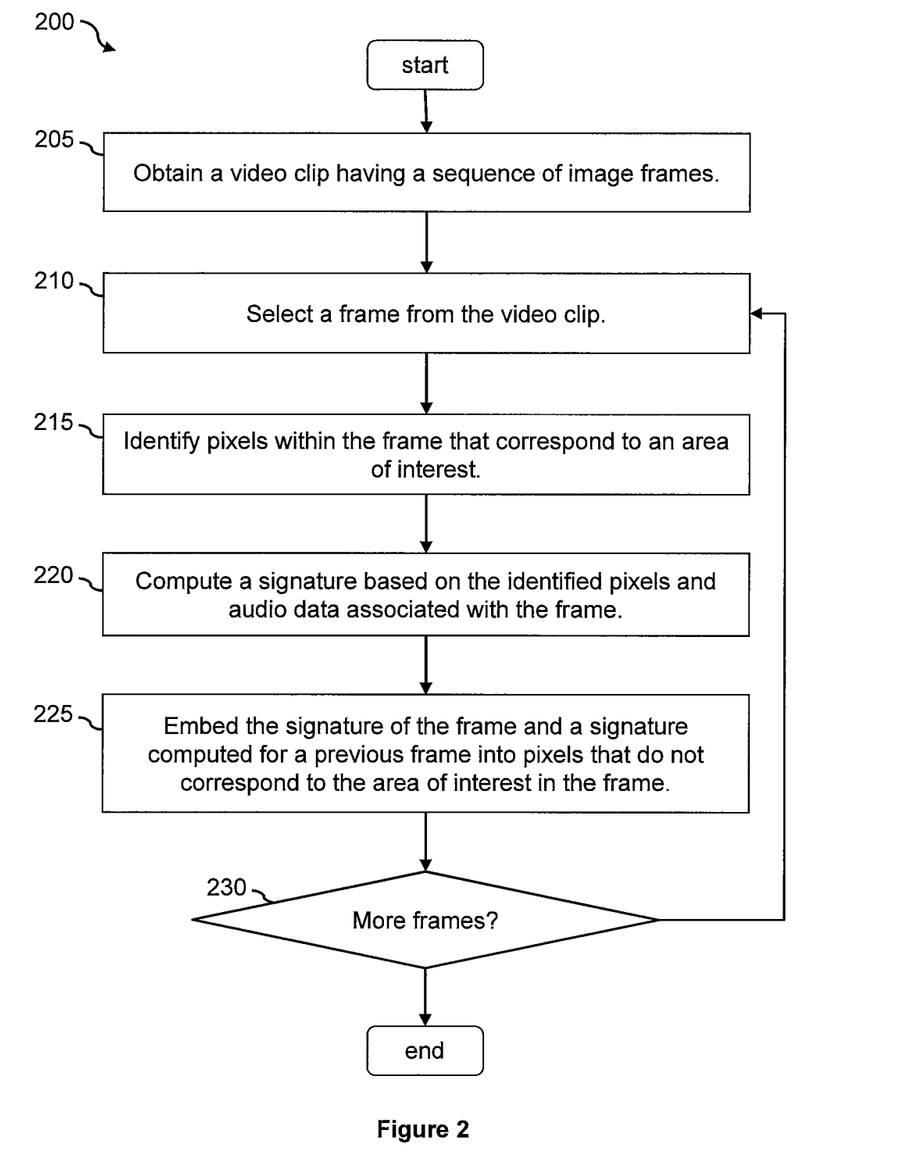
FIG. 2 is a flowchart showing a process of embedding frame signatures in a video clip according to an embodiment of the present disclosure.
Figure 3:
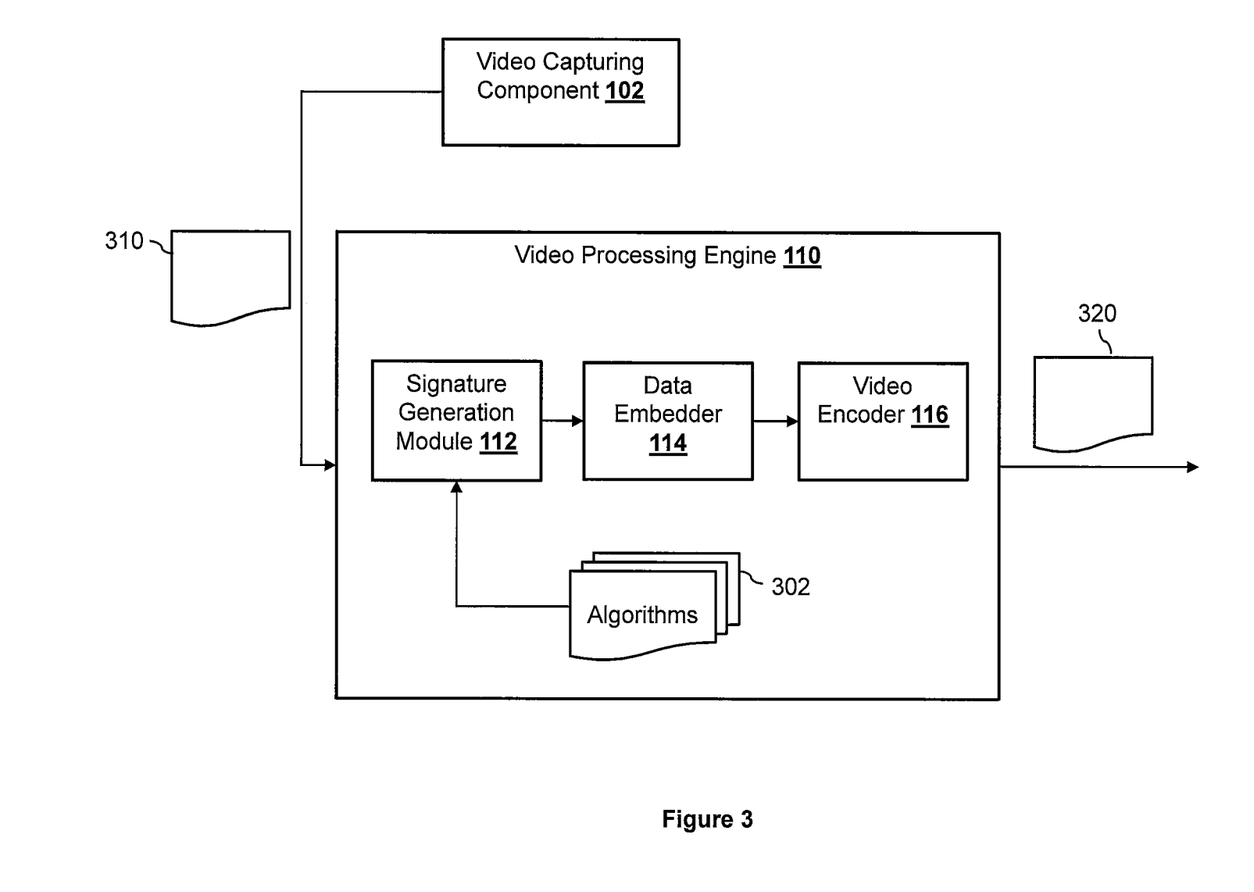
FIG. 3 illustrates a video processing system embedding frame signatures in a video clip according to an embodiment of the present disclosure.

FIG. 2 illustrates a process 200 for embedding frame signatures into a video clip according to various embodiments of the disclosure. In some embodiments, the process 200 may be performed by the video processing engine 110. The process 200 begins by obtaining (at step 205) a video clip having a sequence of image frames. For example, as shown in FIG. 3, the video processing engine 110 may obtain a video clip 310 that is generated by the video capturing component 102. While the video clip 310 may be processed according to embodiments disclosed herein when (or immediately after) the video clip 310 is generated (captured), so that any modifications to the video clip 310 after it is generated can be determined, the video clip can also be processed at any time after the video clip 310 is captured without departing from the spirit of the disclosure. For example, as the video clip 310 is obtained at a video clip distribution source (e.g., a user of a social networking website uploaded a video clip to the social networking website), the video clip distribution source may use the video processing engine 110 to process the video clip 310 to ensure that any modifications to the video clip 310 by other users of the video clip distribution source may be detected.

Figure 4:
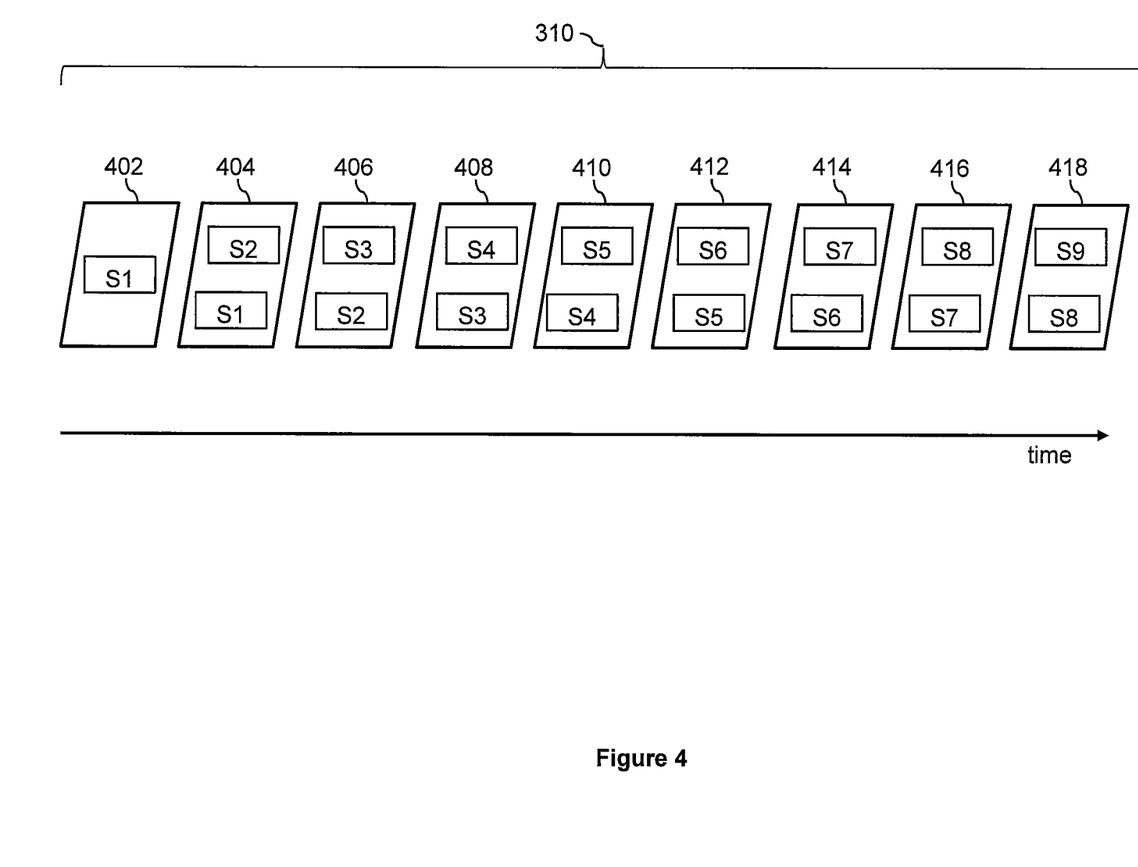
FIG. 4 illustrates an example sequence of image frames associated with a video clip according to an embodiment of the present disclosure.

FIG. 4 illustrates the video clip 310 obtained by the image processing engine 110 according to one embodiment of the disclosure. As shown, the video clip 310 includes a sequence of image frames 402-418. The image frames 402-418 are ordered according to the time that the image frames 402-418 were captured/generated by the video capturing component 102. In this example, the image frame 402 is the first image frame in the sequence, indicating that the image frame 402 was captured before any other frames 404-418 in the sequence. On the other hand, the image frame 418 is the last image frame in the sequence, indicating that the image frame 418 was captured later than any other frames 402-416 in the sequence. Each of the image frames 402-418 may include a frame identifier that uniquely identifies the image frame within the video clip 310. The frame identifier may also indicate a position of the image frame within the sequence. Each image frame may also include a timestamp representing a time that the image frame should be played during a playback of the video clip 310. Each image frame may also include multiple pixels having pixel data. The pixel data of a pixel may represent a pixel value within a color space that can be used by a video player (e.g., the video playback component 104) to generate a presentation of the pixel on an output device (e.g., a screen). In addition to pixel data, each image frame may also include audio data that can be used by the video player to produce an audio output when the image frame is being presented on the output device.

Referring back to FIG. 2, after the video clip is obtained, the process 200 selects (at step 210) an image frame from the video clip. For example, the video processing engine 110 may select the first image frame (e.g., the image frame 402) from the video clip 310. The process 200 then identifies (at step 215) pixels within the image frame that satisfy predetermined criteria (e.g., correspond to or represent an area of interest, etc.). For example, the signature generation module 112 may select one of the algorithms 302 having predetermined criteria for selecting (identifying) pixels within the image frame for generating a frame signature for the image frame. In some embodiment, an interest may be selected for the image frame 402 (and/or for the entire video clip 310), depending on the content of the image frame 402 and/or the video clip 310. For example, the video clip 310 may represent a recording of a person making a speech, thus the person's face may be selected as the interest for the video clip 310. In another example, the video clip 310 may represent a recording of a car race, and cars may be selected as the interest for the video clip 310. In some embodiments, the video processing engine 110 may provide a user interface that enables a user to provide a selection of one or more areas of interest for the video clip being processed. As such, the pixel identification algorithm (the predetermined criteria) may be selected based on the interest (e.g., human faces, cars, etc.).

In some embodiments, the video processing engine 110 may analyze the image frames within the video clip 310 (e.g., by using one or more object recognition algorithms) to determine an object that is dominant (e.g., the object appears in at least a predetermined portion, such as 80%, of the image frames) in the video clip 310. In one example, by analyzing the video clip 310, the video processing engine 110 may determine that faces of one or more person appear in at least a predetermined portion of the video clip 310, and thus determines that human faces are the area of interest for the video clip 310. In another example, by analyzing the video clip 310, the video processing engine 110 may determine that cars appear in at least a predetermined portion of the video clip 310, and thus determines that cars are the area of interest for the video clip 310.

Based on the area of interest determined for the video clip 310, the video processing engine 110 may select one of the different pixel identification algorithms 302 having corresponding predetermined criteria for identifying the pixels within the image frame that satisfy the predetermined criteria. For example, when it is determined that human faces are the area of interest of the video clip 310, the video processing engine 110 may select a pixel identification algorithm that includes a facial recognition algorithm for identifying pixels within the image frame that correspond to human faces (and thus, the predetermined criteria provides a selection of pixels related to a human face). In another example where it is determined that cars are the area of interest of the video clip 310, the video processing engine 110 may select a pixel identification algorithm that includes an object recognition algorithm for identifying pixels within the image frame that correspond to cars (and thus, the predetermined criteria provides a selection of pixels related to cars). In some embodiments, the video processing engine 110 may store an identifier that identifies the selected pixel identification algorithm in the video clip 310 (e.g., in a metadata section of the video clip 310).

In some embodiments, the identified pixels may not correspond to any particular theme or topic. Instead, a pixel identification algorithm may identify pixels within the image frame that satisfy the predetermined criteria. In one example, a pixel identification algorithm may include selecting pixel having pixel values above a predetermined threshold (e.g., a sum of values from the red, green, blue channels of a RGB value set above the predetermined threshold). Another pixel identification algorithm may include selecting pixel having pixel values within a predetermined range. As such, each digital media publisher may have its own proprietary pixel identification algorithm to select pixels for calculating a frame signature. The pixel identification algorithm associated with the digital media publisher may become the secret key for detecting unauthorized alteration of the digital media, such that even if a malicious user has obtained knowledge about the frame signature embedding technique as disclosed herein, the malicious user may not generate the proper frame signature without knowledge of the pixel identification algorithm.

Figure 5:
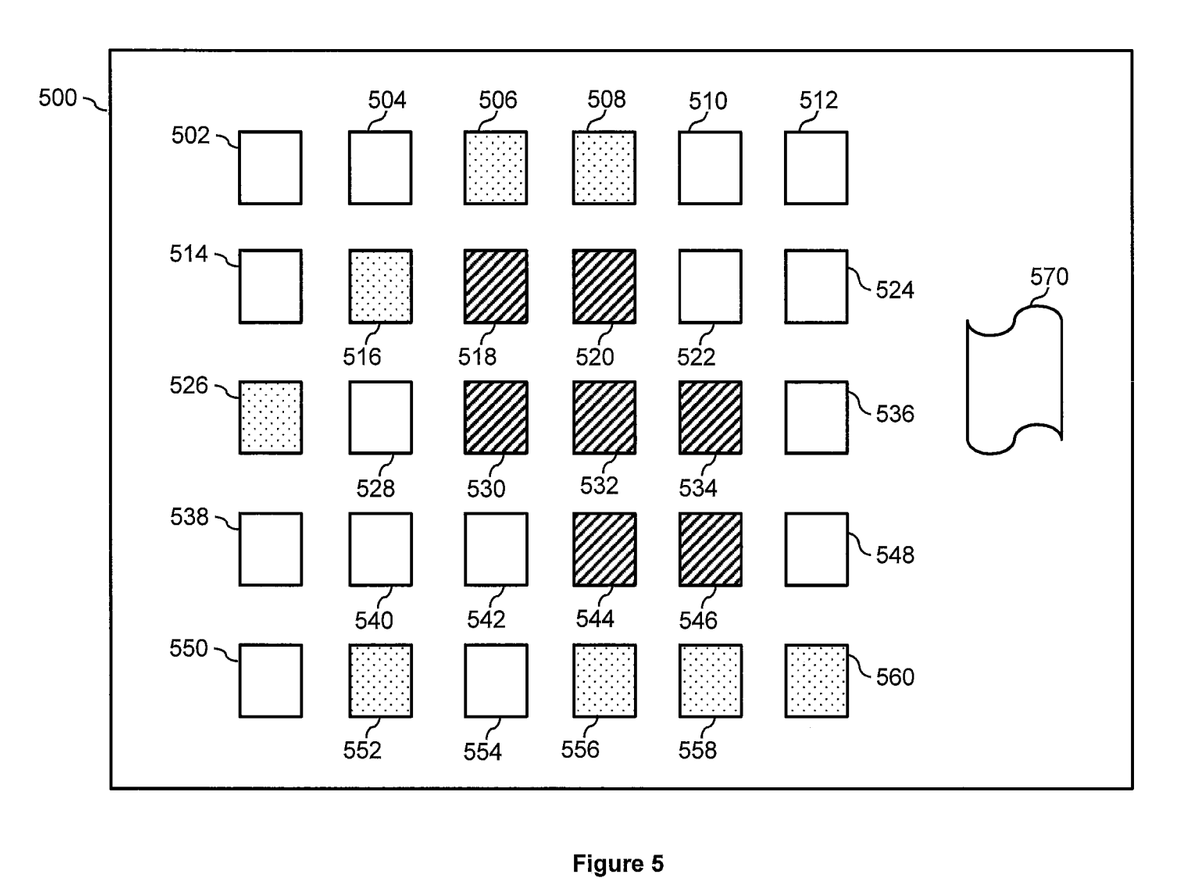
FIG. 5 illustrates an example image frame according to an embodiment of the present disclosure.

Once a pixel identification algorithm is selected, the signature generation module 112 may apply the selected pixel identification algorithm on the image frame (e.g., the image frame 402) to identify pixels within the image frame 402 that correspond to an area of interest. FIG. 5 illustrates an example image frame 500 according to one embodiment of the disclosure. As shown, the image frame 500 is divided into multiple pixel blocks 502-560, including five rows and six columns of pixel blocks. Each of the pixel blocks 502-560 may represent a single pixel within the image frame 500 or a pixel tile comprising multiple pixels. In one embodiment, the image frame may correspond to the image frame 402 or any other image frames in the video clip 310. The image frame 500 may represent a scene captured by the video capturing component 102, which may include one or more features or objects (e.g., a face, a restaurant in the background, a desk, etc.) appeared in the scene. By applying the selected pixel identification algorithm to the image frame 500, the signature generation module 112 may determine that pixel blocks 518, 520, 522, 530, 532, 534, 544, and 546 (the pixel blocks with diagonal lines) correspond to an area of interest (e.g., a person's face) within the image frame.

Referring back to FIG. 2, once pixels corresponding to an area of interest are identified, the process 200 computes (at step 220) a frame signature based on the identified pixels. For example, the signature generation module 112 may use the pixels in the pixel blocks 518, 520, 522, 530, 532, 534, 544, and 546 to calculate a frame signature for the frame 500. In some embodiments, the signature generation module 112 may calculate the frame signature based on the pixel values of every pixel in the pixel blocks 518, 520, 522, 530, 532, 534, 544, and 546. In some embodiments however, when each pixel block includes multiple pixels, the signature generation module 112 may calculate the frame signature based on pixel values of one or more pixels within each of the pixel blocks 518, 520, 522, 530, 532, 534, 544, and 546. For example, the signature generation module 112 may calculate the frame signature based on pixel values of the top left pixel in each of the pixel blocks 518, 520, 522, 530, 532, 534, 544, and 546.

As discussed above, an image frame may also include audio data in addition to pixel data. For example, the image frame 500 is shown to include audio data 570 in addition to pixel blocks 502-560. The audio data 570 may represent audio sound that was captured as the image frame was generated by the video capturing component 102. In some embodiments, the signature generation module 112 may calculate the frame signature based on both the pixel values of the pixel blocks 518, 520, 522, 530, 532, 534, 544, and 546 and the audio data 570 associated with the image frame 500.

In some embodiments, the signature generation module 112 may calculate the frame signature by using a hash function. For example, the signature generation module 112 may generate a hash key based on the pixel values of the pixels in the pixel blocks 518, 520, 522, 530, 532, 534, 544, and 546, and the audio data 570 (e.g., a sum of the pixel values and the audio data), and map the hash key to a hash value. In some embodiments, in order to further reduce the chance of having different hash keys mapping to the same hash value, the signature generation module 112 may impose a requirement that the resulting hash value needs to include a predetermined number (e.g., 4, 10) of leading zeros. When the hash value generated based on the original hash key (e.g., the sum of the pixel values) does not include the predetermined number of zeros, the signature generation module 112 may apply a nonce (e.g., a number) to the hash key (e.g., by adding the nonce to the hash key). The signature generation module 112 may determine if the hash value generated by the modified hash key has the predetermined number of leading zeros, and may continue to increase the nonce (e.g., incrementing the nonce by 1) until the resulting hash value has at least the predetermined number of leading zeros.

The process 200 then embeds (at step 225) the frame signature into the image frame. For example, the data embedder 114 may embed the frame signature (e.g., the hash value) generated for the image frame 500 and the nonce (if applicable) into the image frame 500. In some embodiments, the data embedder 114 may embed the frame signature and the nonce into at least a portion of the pixels within the image frame 500. The data embedder 114 may first select pixels from the image frame 500 for embedding the frame signature and the nonce, and may then embed the frame signature and the nonce into the selected pixels. Embedding the frame signature and the nonce into the selected pixels may include modifying the pixel values of the selected pixels to include data from the frame signature and the nonce.

Different embodiments may use different techniques to select the pixels from the image frame 500 for embedding the frame signature and the nonce. In some embodiments, the data embedder 114 may select the pixel blocks that do not correspond to the area of interest (e.g., the pixel blocks 502-516, 522-528, 536-542, and 548-560), as the pixels that correspond to the area of interest should not be modified. In some embodiments, the data embedder 114 may further eliminate pixel blocks that, if modified, would affect the efficiency of data compression during encoding of the video clip 310. During encoding of the video clip 310, parts of an image frame (e.g., one or more pixel blocks within the image frame 500) may be replaced with a vector pointing to one or more reference blocks of another image frame (e.g., a previous image frame), where the one or more reference blocks have pixel values that are identical to the one or more pixel blocks in the image frame 500. As such, the data embedder 114 may work with the video encoder 116 to identify pixel blocks that do not have corresponding reference blocks (e.g., blocks in another image frame that includes identical pixel values as the pixel blocks) for embedding the frame signature and the nonce. In this example, the data embedder 114 may determine that the pixel blocks 502, 504, 510, 512, 514, 522, 524, 528, 536, 538, 540, 542, 548, 550, and 554 have reference blocks in another frame that include identical pixel values. Thus, the data embedder 114 may select the remaining pixel blocks 506, 508, 516, 526, 552, 556, 558, and 560 (indicated by the dot pattern in FIG. 5) within the image frame 500 for embedding the frame signature and the nonce.

In some embodiments, the data embedder 114 may embed the frame signature and the nonce into the selected pixels by incorporating portions of the frame signature and the nonce into the pixel values of the selected pixels. For example, the data embedder 114 may divide the frame signature and the nonce into multiple portions (e.g., each portion includes one or more bits from the frame signature), and incorporation each divided portion into the pixel value of a corresponding pixel. Specifically, in some embodiments, the data embedder 114 may replace one or more bits (e.g., the least significant bit(s)) of a selected pixel with a corresponding portion (e.g., the corresponding bit(s)) of the frame signature and the nonce. Consider an example where the frame signature and the nonce is represented by the bits '0011', the data embedder 114 may replace the least significant bit of a pixel (e.g., the top left pixel) of the pixel block 506 with the first bit '0' of the frame signature and the nonce. The data embedder 114 may replace the least significant bit of a pixel (e.g., the top left pixel) of the pixel block 508 with the second bit '0' of the frame signature and the nonce. The data embedder 114 may replace the least significant bit of a pixel (e.g., the top left pixel) of the pixel block 516 with the third bit '1' of the frame signature and the nonce. Lastly, the data embedder 114 may replace the least significant bit of a pixel (e.g., the top left pixel) of the pixel block 526 with the fourth bit '0' of the frame signature and the nonce.

In some embodiments, in addition to embedding the frame signature and the nonce of the image frame 500 into the image frame 500, the data embedder 114 may also embed a frame signature and a nonce calculated for another image frame (e.g., a previous image frame) into the image frame 500. For example, the data embedder 114 may concatenate the frame signature and the nonce calculated for the image frame 500 with the frame signature and the nonce calculated for the previous image frame, and may embed the concatenated data into the selected pixels. Using the example given above, when the signature and the nonce calculated for the previous image frame can be represented by the bits '0101,' the data embedder 114 may embed the concatenated bits '00110101' into the selected pixels in the image frame 500. Specifically, the data embedder 114 may replace the least significant bit of a pixel (e.g., the top left pixel) of the pixel block 552 with the fifth bit '0' of the concatenated data. The data embedder 114 may replace the least significant bit of a pixel (e.g., the top left pixel) of the pixel block 556 with the sixth bit '1' of the concatenated data. The data embedder 114 may replace the least significant bit of a pixel (e.g., the top left pixel) of the pixel block 558 with the seventh bit '0' of the concatenated data. Lastly, the data embedder 114 may replace the least significant bit of a pixel (e.g., the top left pixel) of the pixel block 560 with the eighth bit '1' of the concatenated data.

When the number of selected pixel blocks exceeds the number of bits in the concatenated data, the data embedder 114 may repeat the concatenated data across the remaining selected pixel blocks. However, when the number of selected pixel blocks is less than the number of bits in the concatenated data, the video processing engine 110 may have to find a solution to embed the frame signature(s) and the nonce(s) into the image frame. In some embodiments, the video processing engine 110 may adjust the pixel identification algorithm to identify pixels that correspond to only a portion of the features (objects) that are of interest in the video clip. For example, when the area interest of the video clip 310 is determined to be human faces, the video processing engine 110 may adjust the pixel identification algorithm to identify pixels that correspond to only a portion of the human face (e.g., the eyes and/or the mouth of the person's face) such that more pixel blocks would be available for embedding the frame signature(s) and the nonce(s). In some embodiments, instead of or in addition to adjusting the pixel identification algorithm, the data embedder 114 may embed the frame signature(s) and the nonce(s) into both the non-selected background pixel blocks as well as the selected background pixel blocks (e.g., the pixel blocks 502-516, 522-528, 536-542, and 548-560 of the image frame 500).

Referring back to FIG. 2, after the frame signature(s) and the nonce(s) are embedded into the image frame, the process 200 determines (at step 230) whether there are more frames in the video clip. When it is determined that there are more frames in the video clip, the process 200 returns to the step 210 to select another frame (e.g., a subsequent frame) from the video clip and cycles the steps 215-230. Using the video clip 310 as an example shown in FIG. 4, when the video processing engine 110 obtains the video clip 310, for example, from the video capturing component 102, the video processing engine 110 may first select the image frame 402 for processing. The signature generation module 112 may identify pixel blocks within the image frame 402 that correspond to an area of interest (e.g., a person's face), and may calculate a frame signature 'S1' for the image frame 402 based on the identified pixel blocks (and audio data associated with the image frame 402, if available). Since the image frame 402 is the first frame in the video clip 310, the data embedder 114 does not obtain a frame signature calculated for a previous frame. The data embedder 114 may embed the frame signature 'S1' in at least a portion of the pixel blocks within the image frame 402 that do not correspond to the area of interest.

The video processing engine 110 may select another image frame from the video clip 310. For example, the video processing engine 110 may select the next image frame in the sequence of image frames 310 (e.g., the image frame 404) for processing. The signature generation module 112 may identify pixel blocks within the image frame 404 that correspond to an area of interest, and may calculate a frame signature 'S2' based on the identified pixel blocks (and audio data associated with the image frame 404, if available). The data embedder 114 may then embed the frame signature 'S2' calculated for the image frame 404 and the frame signature 'S1' calculated for the image frame 402 into at least a portion of the pixel blocks within the image frame 404 that do not correspond to the area of interest.

The video process engine 110 may continue to process the subsequent image frames 406-418 in the same manner as discussed herein to embed frame signatures into the image frames. Thus, a frame signature 'S3' calculated for the image frame 406 and the frame signature 'S2' calculated for the image frame 404 are embedded in the image frame 406, a frame signature 'S4' calculated for the image frame 408 and the frame signature 'S3' calculated for the image frame 406 are embedded in the image frame 408, a frame signature 'S5' calculated for the image frame 410 and the frame signature 'S4' calculated for the image frame 408 are embedded in the image frame 410, a frame signature 'S6' calculated for the image frame 412 and the frame signature 'S5' calculated for the image frame 410 are embedded in the image frame 412, a frame signature 'S7' calculated for the image frame 412 and the frame signature 'S6' calculated for the image frame 412 are embedded in the image frame 414, a frame signature 'S8' calculated for the image frame 416 and the frame signature 'S7' calculated for the image frame 414 are embedded in the image frame 416, and a frame signature 'S9' calculated for the image frame 418 and the frame signature 'S8' calculated for the image frame 416 are embedded in the image frame 418.

In this example, it is shown that frame signatures are calculated and embedded in every image frame in the video clip 310. However, in order to reduce processing cost and time, in some embodiments, frame signatures may be calculated and embedded in order a portion of the image frames within the video clip 310. For example, the video processing engine 110 may process every three image frames, instead of every image frame, in the video clip 310. In such an example, the signature 'S1' calculated for the image frame 402 is embedded in the image frame 402, the frame signature 'S4' calculated for the image frame 408 and the frame signature 'S1' calculated for the image frame 402 are embedded in the image frame 408, and the frame signature 'S7' calculated for the image frame 414 and the frame signature 'S4' calculated for the image frame 408 are embedded in the image frame 414.

Once frame signatures are calculated and embedded into the image frames of the video clip 310, the video encoder 116 may encode the video clip 310 to generate encoded video clip 320 using any one of the available video coding format (e.g., MPEG-2, MPEG-4, H.264, etc.). As such, the video processing engine 110 may be implemented within a video encoder in some embodiments. The encoded video clip 320 may be stored in a non-transitory memory or transmitted to another device over a local connection or over a network. In some embodiments, the encoded video clip 320 may be played by the video playback component 104. The video playback component 104 may be a video playback application (e.g., VLC Video Player, QuickTime® Player, etc.) or a video streaming application (e.g., YouTube®, Hulu®, etc.). In some embodiments, the video processing engine 110 may be integrated within the video playback component 104, or work with the video playback component 104. Specifically, the video processing engine 110 may process the video clip to determine whether the video clip is authentic (e.g., whether it has been modified after it has been encoded) before or during the presentation of the video clip in an output device (e.g., a screen, a projector, etc.).

Figure 6:
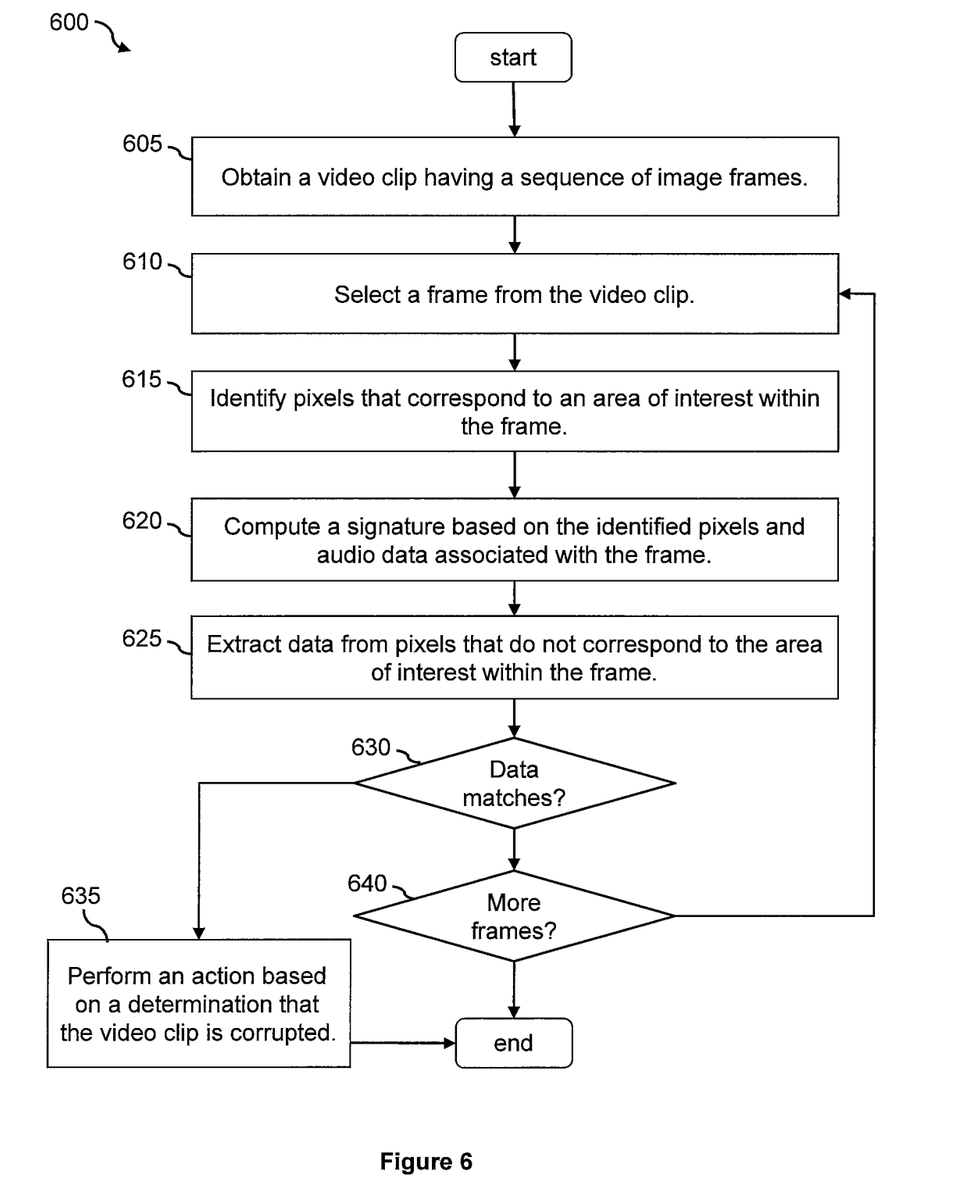
FIG. 6 is a flowchart showing a process of determining an authenticity of a video clip according to an embodiment of the present disclosure.
Figure 7:
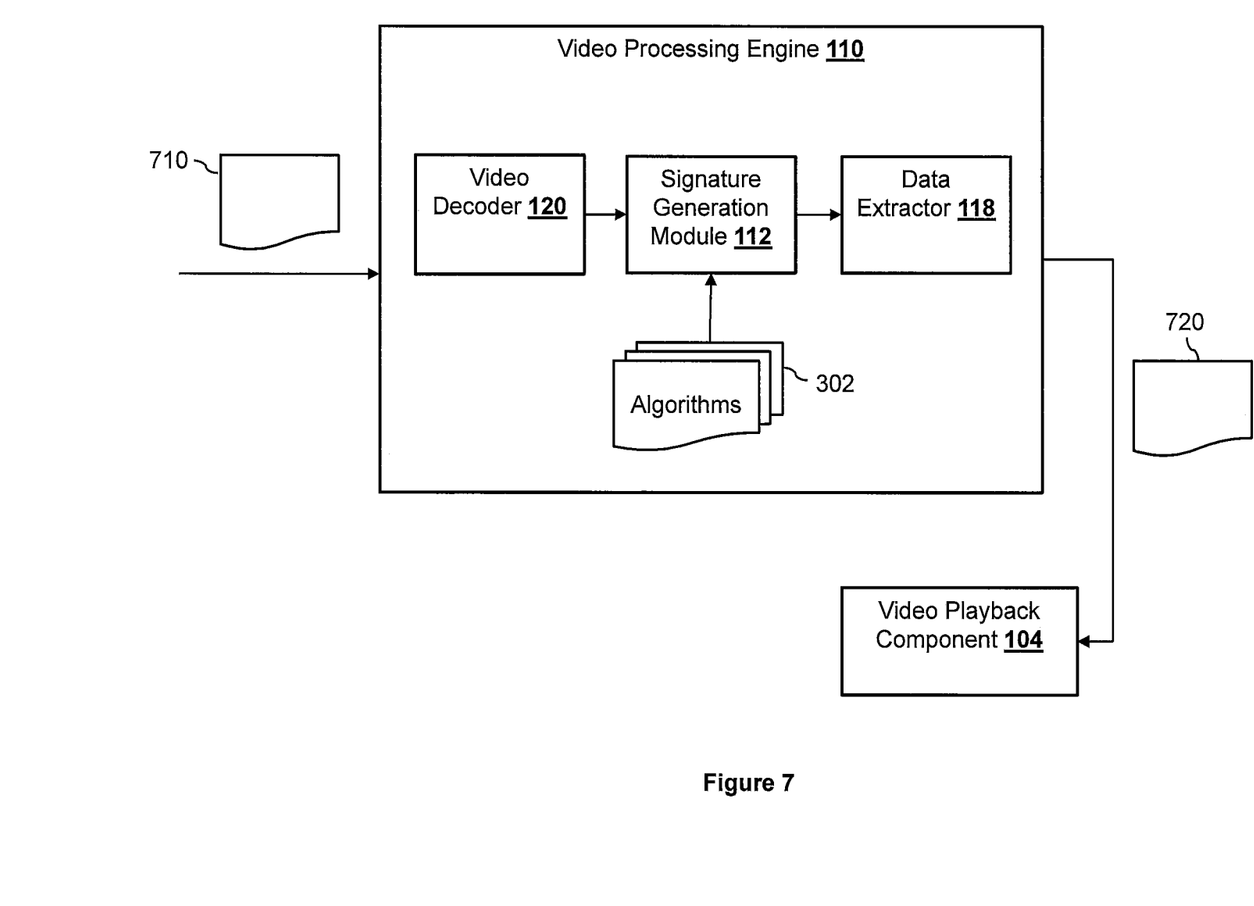
FIG. 7 illustrates a video processing system determining an authenticity of a video clip according to an embodiment of the present disclosure.

FIG. 6 illustrates a process 600 for determining an authenticity of a video clip according to various embodiments of the disclosure. In some embodiments, the process 600 may be performed by the video processing engine 110. The process 600 begins by obtaining (at step 605) a video clip. For example, as shown in FIG. 7, the video processing engine 110 may obtain a video clip 710. The video clip 710 may have been processed by the video processing engine 110 such that frame signatures are calculated and embedded in the image frames of the video clip 710, using the techniques disclosed herein. In some embodiments, the video clip 710 may be an encoded video clip 710 that has been encoded in one of the available video coding format. Furthermore, the encoded video clip 710 may correspond to the video clip 310 of FIG. 4. As such, the video decoder 120 of the video processing engine 110 may decode the video clip 710 to generate the image frames 402-418. In some embodiments, the video processing engine 110 may not need to decode the entire video clip 710 before the video processing engine 110 begin to determine the authenticity of the video clip 710. Since the video processing engine 110 may determine the authenticity of the video clip 710 frame-by-frame, the video processing engine 110 may begin examining the image frames as the image frames are being decoded by the video decoder 120. For example, when the video decoder 120 has decoded the image frames 402 and 404, but has not decoded the other image frames 406-418, the video processing engine 110 may begin examining the image frames 402 and 404 to determine whether the image frames 402 and 404 are authentic, while the video decoder 120 is decoding other image frames within the video clip 310. This feature is especially beneficial when the video clip is being streamed by a video streaming application since the video processing engine 110 and the video playback component 104 may not have access to the entire video clip 310 at any given time.

The process 600 then selects (at step 610) an image frame from the video clip. For example, the video processing engine 110 may select an image frame that has been decoded by the video decoder 120. In some embodiments, the video decoder 120 may decode the sequence of image frames associated with the video clip 710 in the order of the sequence. As such, the video decoder 120 may decode the image frame 402 and may send the decoded image frame 402 to the signature generation module 112.

Steps 615 and 620 are similar to the steps 215 and 220 of the process 200. For the selected image frame, the process 600 identifies (at step 615) pixels within the image frame that correspond to an area of interest, and calculates (at step 620) a frame signature for the image frame. For example, using the example illustrated in FIG. 5, the signature generation module 112 may determine that the pixel blocks 518, 520, 530, 532, 534, 544, and 546 correspond to an area of interest (e.g., satisfy predetermined criteria). As discussed above, the signature generation module 112 may select one of the algorithms 302 having predetermined criteria for selecting (identifying) pixels within the image frame for generating a frame signature for the image frame. For example, the video clip 710 may represent a recording of a person making a speech, thus the person's face may be selected as the area of interest for the video clip 710. In another example, the video clip 710 may represent a recording of a car race, and cars may be selected as the area of interest for the video clip 310. As such, the pixel identification algorithm (the predetermined criteria) may be selected based on the interest (e.g., human faces, cars, etc.).

In some embodiments, the video processing engine 110 may provide a user interface that enables a user to provide a selection of an area of interest for the video clip being processed. In some embodiments, the video processing engine 110 may analyze the image frames within the video clip 710 (e.g., by using one or more object recognition algorithms) to determine an object that is dominant (e.g., the object appears in at least a predetermined portion, such as 80%, of the image frames) in the video clip 710. In one example, by analyzing the video clip 710, the video processing engine 110 may determine that faces of one or more person appear in at least a predetermined portion of the video clip 710, and thus determines that human faces are the area interest for the video clip 710. In another example, by analyzing the video clip 710, the video processing engine 110 may determine that cars appear in at least a predetermined portion of the video clip 710, and thus determines that cars are the area of interest for the video clip 710.

Based on the area of interest determined for the video clip 710, the video processing engine 110 may select one of the different pixel identification algorithms 302 having corresponding predetermined criteria for identifying the pixels within the image frame that satisfy the predetermined criteria. For example, when it is determined that human faces are the area of interest of the video clip 710, the video processing engine 110 may select a pixel identification algorithm that includes a facial recognition algorithm for identifying pixels within the image frame that correspond to human faces. In another example where it is determined that cars are the area of interest of the video clip 710, the video processing engine 110 may select a pixel identification algorithm that includes an object recognition algorithm for identifying pixels within the image frame that correspond to cars. Areas of interest need not be limited to a single area, but may include multiple different areas of interest.

In some embodiments, the identified pixels may not correspond to any particular theme or topic. Instead, a pixel identification algorithm may identify pixels within the image frame that satisfy the predetermined criteria. In one example, a pixel identification algorithm may include selecting pixel having pixel values above a predetermined threshold (e.g., a sum of values from the red, green, blue channels of a RGB value set above the predetermined threshold). Another pixel identification algorithm may include selecting pixel having pixel values within a predetermined range. As such, each digital media publisher may have its own proprietary pixel identification algorithm to select pixels for calculating a frame signature. The pixel identification algorithm associated with the digital media publisher may become the secret key for detecting unauthorized alteration of the digital media, such that even if a malicious user has obtained knowledge about the frame signature embedding technique as disclosed herein, the malicious user may not generate the proper frame signature without knowledge of the pixel identification algorithm.

In some embodiments, when frame signatures were generated for the video clip (e.g., by the same or another instance of the video processing engine 110), an identifier that identifies the pixel identification algorithm selected for the video clip 710 was stored in the video clip 710 (e.g., in the metadata section of the video clip 710). As such, the video process engine 110 of some embodiments may look into the metadata section of the video clip 710 to retrieve the identifier, and may select one of the pixel identification algorithms 302 based on the retrieved identifier.

Once a pixel identification algorithm is selected, the signature generation module 112 may apply the selected pixel identification algorithm on the image frame (e.g., the image frame 402) to identify pixels within the image frame 402 that correspond to an area of interest, in a manner discussed herein. For example, by applying the selected pixel identification algorithm to the image frame 500, the signature generation module 112 may determine that pixel blocks 518, 520, 522, 530, 532, 534, 544, and 546 (the pixel blocks with diagonal lines) correspond to an area of interest (e.g., a person's face) within the image frame, and may calculate a frame signature for the image frame 500.

The signature generation module 112 may then use the pixels in the pixel blocks 518, 520, 522, 530, 532, 534, 544, and 546 to calculate a frame signature for the frame 500. In some embodiments, the signature generation module 112 may calculate the frame signature based on the pixel values of every pixel in the pixel blocks 518, 520, 522, 530, 532, 534, 544, and 546. In some embodiments however, when each pixel block includes multiple pixels, the signature generation module 112 may calculate the frame signature based on pixel values of one or more pixels within each of the pixel blocks 518, 520, 522, 530, 532, 534, 544, and 546. For example, the signature generation module 112 may calculate the frame signature based on pixel values of the top left pixel in each of the pixel blocks 518, 520, 522, 530, 532, 534, 544, and 546.

When the image frame 500 includes audio data (e.g., the audio data 570) in addition to pixel data. The signature generation module 112 may calculate the frame signature for the image frame 500 based on both the pixel values of the pixel blocks 518, 520, 522, 530, 532, 534, 544, and 546 and the audio data 570 associated with the image frame 500.

As discussed above, the signature generation module 112 may calculate the frame signature by using a hash function. For example, the signature generation module 112 may generate a hash key based on the pixel values of the pixels in the pixel blocks 518, 520, 522, 530, 532, 534, 544, and 546, and the audio data 570 (e.g., a sum of the pixel values and the audio data), and mapping the hash key to a hash value. In some embodiments, the signature generation module 112 may extract a nonce from the image frame 500 and apply to the nonce to the hash key before using the hash function to generate a has value for the image frame 500.

Referring back to FIG. 6, the process 600 then extracts (at step 625) data from pixels within the frame that do not correspond to the area of interest. For example, using the image frame 500 as an example, the data extractor 118 may select the pixel blocks that do not correspond to the area of interest (e.g., the pixel blocks 502-516, 522-528, 536-542, and 548-560). In some embodiments, the data extractor 118 may also work with the video decoder 120 to eliminate pixel blocks that have corresponding reference blocks from another image frame in the video clip. In this example, the data extractor 118 may determine that the pixel blocks 502, 504, 510, 512, 514, 522, 524, 528, 536, 538, 540, 542, 548, 550, and 554 have reference blocks in another frame that include identical pixel values. Thus, the data extractor 118 may select the remaining pixel blocks 506, 508, 516, 526, 552, 556, 558, and 560 (indicated by the dot pattern in FIG. 5) within the image frame 500 for extracting the data. For example, the data extractor 118 may extract the data by retrieving the least significant bits of the pixels from the pixel blocks 506, 508, 516, 526, 552, 556, 558, and 560. The retrieved data may indicate a frame signature that was calculated for the image frame 500 when the video clip was encoded.

In some embodiments when a nonce was used to calculate the frame signature for the image frame 500 when the video clip was encoded, the data may also indicate the nonce. As such, the extracted data may be used by signature generation module 112 to calculate the frame signature for the frame 500 at the step 620. If the image frame 500 has not been modified, the frame signature calculated by the signature generation module 112 should match the frame signature that was embedded in the image frame 500. However, if the image frame 500 has been modified (e.g., an image of another person has been superimposed onto the image frame 500), the new frame signature calculated by the signature generation module 112 would not match the frame signature that was embedded in the image frame 500.

Thus, at step 630, the process 600 compares the frame signature calculated for the image frame against the data extracted from the image frame to determine if they match. For example, the video processing engine 110 may determine whether the frame signature that the signature generation module 112 calculated for the image frame 500 matches the data extracted from the pixel blocks 506, 508, 516, 526, 552, 556, 558, and 560. If the frame signature matches the extracted data, the process 600 determines (at step 640) whether there are more image frames in the video clip. If there are more image frames in the video clip, the process 600 selects another image frame from the video clip (e.g., the next image frame) from the video clip for processing. Using the sequence of image frames 402-418 as an example, the video processing engine 110 may first process the image frame 402. Since the image frame 402 is the first frame of the video clip 710, only the frame signature calculated for the image frame 402 is embedded in the image frame 402. As such, the video processing engine 101 may calculate a frame signature 'S1' for the image frame 402, extract data from pixels within the image frame 402 that do not correspond to an area of interest, and determine whether the frame signature 'S1' matches the extracted data. When it is determined that the frame signature 'S1' matches the extracted data, the video processing engine 110 may determine that the image frame 402 is authentic and move on to the next frame (e.g., image frame 404). The video processing engine 110 may also store the frame signature 'S1' calculated for the image frame 402.

The video processing engine 110 may then calculate a frame signature 'S2' for the image frame 404, extract data from pixels within the image frame 404 that do not correspond to an area of interest, and determine whether the extracted data matches the image frame 'S2' calculated for the image frame 404 and the frame signature 'S1' calculated for the image frame 402. If it is determined that the extracted data does not match the frame signature 'S2,' the video processing engine 110 may determine that the image frame 404 has been modified (corrupted), and thus, not authentic. If it is determined that the extracted data matches the frame signature 'S2' but does not match the frame signature 'S1,' the video processing engine 110 may determine that while the image frame 404 has not been modified, the order of the image frames in the video clip 710 may have been changed. Thus, the video processing engine 110 may still determine that the video clip 710 is corrupted (not authentic). As such, using the techniques disclosed herein, the video processing engine 110 may detect not only modifications to the image frames in a video clip, but also detect modifications to the order of the image frames.

If it is determined that the extracted data matches both the frame signature 'S1' and the frame signature 'S2,' the video processing engine 110 may determine that the image frame 404 is authentic. The video processing engine 110 may continue to process the image frames of the video clip 710 in the same manner until all of the image frames in the video clip 710 is processed. When it is determined that all of the image frames 402-418 are authentic, the video processing engine 110 may present a notification indicating that the video clip 710 is authentic. For example, when the video processing engine 110 determines the authenticity of the video clip 710 is based on a request to play the video clip 710 using the video playback component 104, the video processing engine 110 may present the notification on the interface of the video playback component 104. In some embodiments, the video processing engine 110 may superimpose the notification on the image frames of the video clip 710 to generate a video clip 720 such that the notification is presented along with the image frames when the video clip 720 is presented on an output device (e.g., a screen, a projector, etc.).

On the other hand, if it is determined that the frame signature does not match the extracted data for any one of the image frames, the video processing engine 110 may determine that the video clip 710 is not authentic. As such, the process 600 may perform (at step 635) an action based on the determination that the video clip is not authentic (is corrupted). For example the video processing engine 110 may present a notification on a user interface indicating that the video clip 710 is not authentic. In some embodiments, when the video processing engine 110 determines the authenticity of the video clip 710 based on a request to play the video clip 710, the video processing engine 110 may present on the interface of the video playback component 104 the notification. For example, the video processing engine 110 may superimpose the notification on the image frames of the video clip 710 to generate the video clip 720 such that the notification is presented along with the image frames when the video clip 720 is presented on an output device (e.g., a screen, a projector, etc.). In some embodiments when the video playback component 104 is a video streaming application, the video processing engine 110 may abort streaming of the video clip 710 and present a notification on the output device indicating that the video clip 710 is corrupted.

In the example illustrated above, every image frame in the video clip 710 is processed (e.g., a frame signature is calculated for every image frame and compared against the extracted data). However, as discussed above, in some embodiments, frame signatures are not embedded in every image frame of the video clip. For example, the data embedder 114 may be configured to embed frame signatures in every three image frames in the video clip 710. As such, during the process of determining the authenticity of the video clip 710, the video processing engine 110 may select every three frames in the video clip 710 (e.g., image frames 402, 408, and 414) for processing.

Furthermore, in the example illustrated above, the video clip 710 corresponds to the whole video clip 310. However, the video clip 710 may include only a portion of the image frames 402-418. For example, after the video clip 310 has been distributed or transmitted to a user, the user may extract a portion of the video clip 310 (e.g., image frames 408-416) to generate the video clip 710. As such, the video clip 710 may only include the image frames 408-416. One of the advantages of the authentication verification techniques disclosed herein is that the video processing engine 110 may independently verify the authenticity of a portion of the video clip even when the entire video clip is not accessible. In this example, the video processing engine 110 may calculate a frame signature 'S4' for the image frame 408 and determine whether the frame signature 'S4' matches data extracted from the image frame 408. The video processing engine 110 may store the frame signature 'S4.' When processing the next image frame 410, the video processing engine 110 may calculate a frame signature 'S5' for the image frame 410, and determine whether the data extracted from the image frame 410 matches the frame signature 'S5' and the frame signature 'S4.' The video processing engine 110 may continue to process the remaining image frames 412, 414, and 416 in the same manner to determine whether any one of the image frames is corrupted.

Figure 8:
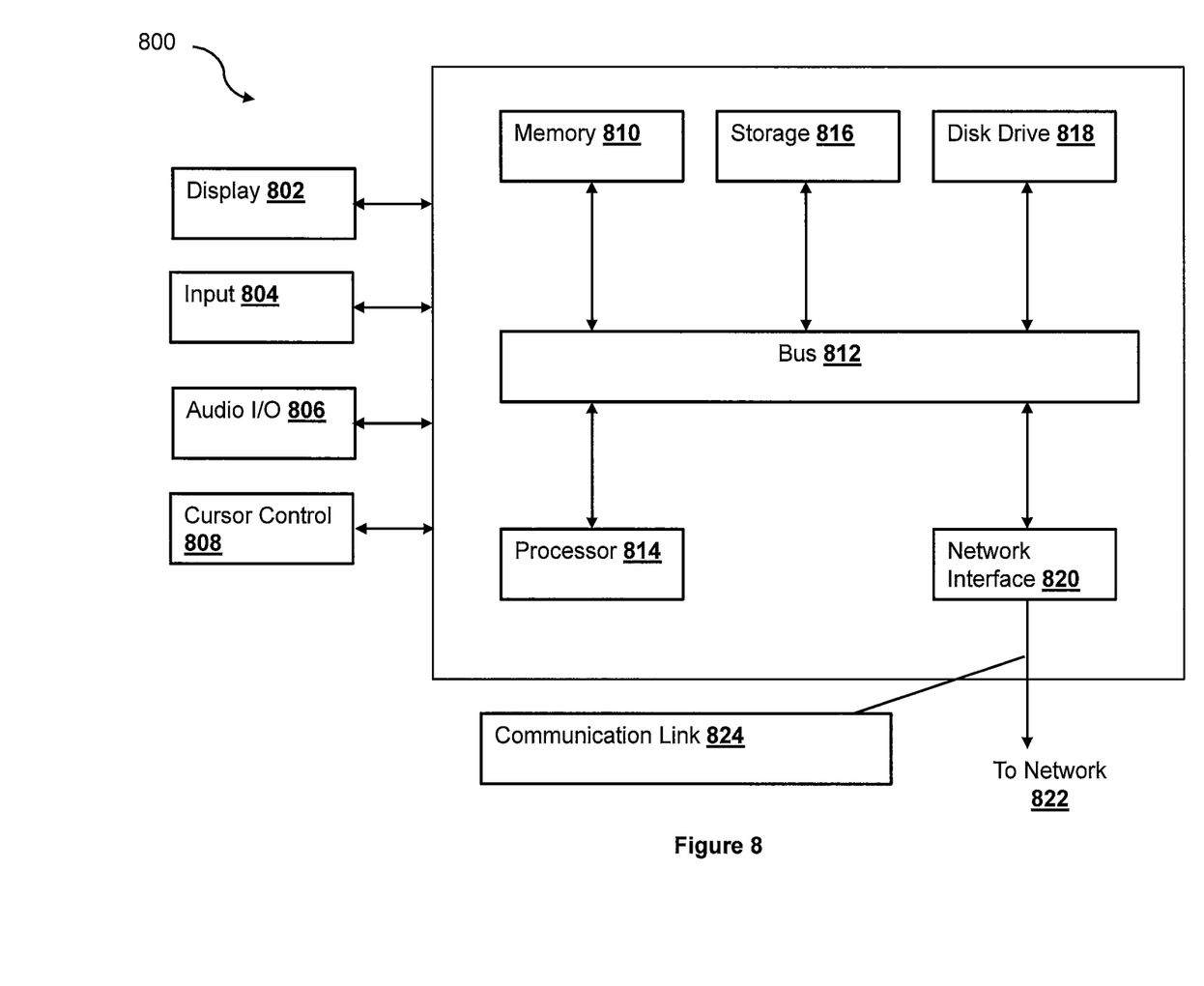
FIG. 8 is a block diagram of a system for implementing a device according to an embodiment of the present disclosure.

FIG. 8 is a block diagram of a computer system 800 suitable for implementing one or more embodiments of the present disclosure, including the video processing engine 110, the video capturing component 102, and the video playback component 104. In various implementations, the video processing engine 110 may be implemented in a device that may include a mobile cellular phone, personal computer (PC), laptop, wearable computing device, etc.

adapted for wireless communication, and the service provider server 130 may include a network computing device, such as a server. Thus, it should be appreciated that the video processing engine 110, the video capturing component 102, and the video playback component 104 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a video clip. An optional audio input/output component 806 may also be included to allow a user to use voice for inputting information by converting audio signals. The audio I/O component 806 may allow the user to hear audio associated with the video clip. A transceiver or network interface 820 transmits and receives signals between the computer system 800 and other devices, such as another video capturing device or another video playback device via network 822. In one embodiment, the transmission is wireless, although other transmission mediums and methods may also be suitable. A processor 814, which can be a microcontroller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid state drive, a hard drive). The computer system 800 performs specific operations by the processor 814 and other components by executing one or more sequences of instructions contained in the system memory component 810. For example, the processor 814 can perform the video authentication functionalities described herein according to the processes 200 and 600.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM; any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 700 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled with the non-transitory memory and configured to read instructions from the non-transitory memory to cause the system to perform operations comprising:
   obtaining a video clip comprising a sequence of image frames;
   analyzing content in the sequence of image frames;
   determining, based on the analyzing, one or more image frames of the sequence of image frames that include an object of interest;
   determining that a number of the one or more image frames exceeds a threshold;
   based on determining that the number of the one or more image frames exceeds the threshold, generating, for each image frame of the one or more image frames, a signature, wherein the generating the signature for an image frame comprises identifying pixels corresponding to the object of interest within the image frame and calculating a value based on the identified pixels; and embedding, within each image frame of the one or more image frames, a first signature generated for the image frame and a second signature generated for a previous image frame of the one or more image frames.

2. The system of claim 1, wherein the object of interest comprises a face of a person, and wherein the determining the object of interest comprises applying a facial recognition algorithm to the sequence of image frames.

3. The system of claim 1, wherein each image frame in the one or more image frames is associated with audio data, and wherein the value calculated for the signature is further based on the audio data associated with the image frame.

4. The system of claim 1, wherein the first signature and the second signature are embedded in an area of the image frame that does not correspond to a reference block.

5. The system of claim 4, wherein the embedding the first signature and the second signature within each image frame comprises:

identifying a group of pixel blocks in the image frame that does not include the object of interest;

eliminating, from the group of pixel blocks, pixel blocks having corresponding reference blocks in the second image frame during a video compression process; and subsequent to eliminating the pixel blocks from the group of pixel blocks, designating pixels in the remaining pixel blocks in the group for embedding the first and second signatures.

6. The system of claim 1, wherein the operations further comprise:

determining a dominant feature in the video clip by analyzing a first image frame in the sequence of image frames; and selecting, from a plurality of image recognition algorithms, a first image recognition algorithm for determining the object of interest based on the determined dominant feature in the first image frame.

7. The system of claim 1, wherein the calculating the value comprises applying a hash function to pixel values associated with the identified pixels.

8. The system of claim 1, wherein the video clip is being streamed by a video streaming application, and wherein the operations further comprise causing the video streaming application to perform an action based on the determined authenticity of the video clip.

9. The system of claim 8, wherein the action comprises at least one of aborting the streaming of the video clip or presenting a notification on an interface of the video streaming application indicating the determined authenticity of the video clip.

10. A method for determining an authenticity of a video clip comprising a sequence of image frames, the method comprising:

analyzing, by the one or more hardware processors, content in the sequence of image frames;

determining, by the one or more hardware processors based on the analyzing, one or more image frames of the sequence of image frames that include an object of interest;

determining that a number of the one or more image frames exceeds a threshold;

based on determining that the number of the one or more image frames exceeds the threshold, generating, by the one or more hardware processors for each image frame in the one or more image frames, a signature, wherein the generating the signature for an image frame comprises identifying pixels corresponding to the object of interest within the image frame and calculating a value based on the identified pixels;

extracting, by the one or more hardware processors, data from each image frame in the one or more image frames; and determining, by the one or more hardware processors, the authenticity of the video clip by comparing, for each image frame in the one or more image frames, the data extracted from the image frame against a first signature generated for the image frame and a second signature generated for a previous image frame in the one or more image frames.

11. The method of claim 10, wherein each image frame in the one or more image frames is associated with audio data, and wherein the value is calculated for an image frame further based on the audio data associated with the image frame.

12. The method of claim 10, wherein the video clip is being streamed by a video streaming application, and wherein the method further comprises causing the video streaming application to perform an action based on the determined authenticity of the video clip.

13. The method of claim 12, wherein the action comprises aborting the streaming of the video clip.

14. The method of claim 12, wherein the action comprises presenting a notification on an interface of the video streaming application indicating the determined authenticity of the video clip.

15. The method of claim 10, wherein the object of interest comprises a face of a person, and wherein the identifying the pixels comprises applying a facial recognition algorithm to the image frame.

16. A non-transitory machine-readable medium having stored thereon machine-readable instructions executable to cause a machine to perform operations comprising:

obtaining a video clip comprising a sequence of image frames;

analyzing content in the sequence of image frames;

determining, based on the analyzing, one or more image frames in the sequence of image frames that include an object of interest;

determining that a number of the one or more image frames exceeds a threshold;

based on determining that the number of the one or more image frames exceeds the threshold, generating, for each image frame in the one or more image frames, a signature, wherein the generating the signature for an image frame comprises identifying pixels corresponding to the object of interest within the image frame and calculating a value based on the identified pixels; and embedding, within each image frame in the one or more image frames, a first signature generated for the image frame and a second signature generated for a previous image frame in the one or more image frames.

17. The non-transitory machine-readable medium of claim 16, wherein the object of interest comprises a face of a person, and wherein the identifying the pixels comprises applying a facial recognition algorithm to the image frame.

18. The non-transitory machine-readable medium of claim 16, wherein each image frame in the one or more image frames is associated with audio data, and wherein the value calculated for the signature is further based on the audio data associated with the image frame.

19. The non-transitory machine-readable medium of claim 16, wherein the first signature and the second signature are embedded in an area of the image frame that does not correspond to a reference block.

20. The non-transitory machine-readable medium of claim 16, wherein the operations further comprise:
- determining a dominant feature in the video clip by analyzing a first image frame in the sequence of image frames; and
- selecting, from a plurality of image recognition algorithms, a first image recognition algorithm for determining the object of interest based on the determined dominant feature in the first image frame.

* * * * *